United States Patent [19]
Kreitner et al.

[11] 3,863,038
[45] Jan. 28, 1975

[54] DISC BRAKE

[75] Inventors: Charles A. Kreitner, Benton Harbor, Mich.; George H. Morgan, South Bend, Ind.

[73] Assignee: Lambert Brake Corporation, St. Joseph, Mo.

[22] Filed: June 26, 1973

[21] Appl. No.: 373,631

[52] U.S. Cl. .............................. 188/170, 188/72.3
[51] Int. Cl. ............................................. F16d 65/24
[58] Field of Search ................. 188/71.5, 72.3, 170; 192/91 A, 91 R

[56] References Cited
UNITED STATES PATENTS

| | | | |
|---|---|---|---|
| 2,857,992 | 10/1958 | Rappaport | 188/71.5 X |
| 3,082,647 | 3/1963 | Banker | 188/170 X |
| 3,559,772 | 2/1971 | Grombka | 188/170 |
| 3,688,877 | 9/1972 | Day | 188/170 X |

FOREIGN PATENTS OR APPLICATIONS

| | | | |
|---|---|---|---|
| 934,142 | 8/1963 | Great Britain | 188/170 |

*Primary Examiner*—Duane A. Reger
*Attorney, Agent, or Firm*—Olson, Trexler, Wolters, Bushnell & Fosse, Ltd.

[57] ABSTRACT

A disc brake unit comprises a disc assembly of interleaved rotor discs and stator discs that are normally spring-biased to a brake-engaged condition. A hydraulically operated piston engages one of the stator discs to move it axially in opposition to the spring bias to release the pressure between the discs and thus release the brake. The piston includes an annular skirt that surrounds the rotor discs and has opposed slots through which the stator discs project for sliding engagement on torque pins. The unit may be mounted between a hydraulic motor and a gear box or simply on the end of the motor.

10 Claims, 5 Drawing Figures

DISC BRAKE

Background of the Invention

This invention relates to improvements in brakes of the type primarily intended to be located in a power transmission train between a hydraulic drive motor and a speed reduction unit.

In hydraulically driven power trains it is a common practice to use hydraulic motors as a brake as well as for driving the transmission or gear reduction unit. However, in the event of hydraulic failure, the braking action of the hydraulic motor is no longer available. Furthermore, even without failure, the hydraulic motor cannot be relied upon to hold a load in a fixed position for any substantial length of time. This is due to the fact that hydraulic systems inherently tend to lose pressure over a period of time when the system is in a static condition. Therefore, for reasons of safety, it is desirable to provide an emergency or parking brake in the power train that is energized in the event of hydraulic line failure or shut-down.

It is known that hydraulic drive motors have excellent speed control properties but relatively poor position control properties. Therefore, a normally engaged brake in the power train that is disengaged by hydraulic pressure provides a simple and practical means for position control of a hydraulically driven member. Thus, by simply releasing the hydraulic pressure to the brake unit, the driven member can be held in a fixed position.

As will be apparent from the detailed description hereafter, the brake of the present invention has a wide range of application other than simply between a hydraulic motor and a gear box. For instance, the brake may be suspended or hung off of the end of the hydraulic motor or other source of motive power. Furthermore, the brake may be used in various applications such as in vehicle power trains, machine tools, cable reels, and servomechanism type applications, to mention but a few.

Objects and Summary of the Invention

An object of the invention is to provide a brake that is automatically engaged by means of a spring force within the brake, and wherein hydraulic pressure is applied to the brake to cause the brake to be released.

A further object of this invention is to provide a brake of the type and for the purpose stated that is so constructed and arranged as to permit containment of the brake within a relatively small diameter.

It is another object of this invention to provide a brake of the type stated which is capable of being adapted for use with various power trains.

In accordance with the foregoing objects the brake comprises a rotor having means for coupling to a shaft, a plurality of rotor discs, and cooperating means on the rotor discs and the rotor for mounting the rotor discs on the rotor for rotation therewith but permitting axially sliding movement of the rotor discs relative to the rotor. There is further provided a stator including a housing that receives the rotor and the rotor discs. A plurality of stator discs in the housing are interleaved with the rotor discs. The rotor discs and the stator discs comprise a disc assembly that has a primary stator disc. Spring means are in the housing for biasing the disc assembly against an abutment in the housing whereby the brake is normally maintained in the energized condition. Within the housing is an annular piston having an annular piston skirt engaging the primary stator disc and being in surrounding relation to the rotor discs. The stator discs are in sliding engagement with torque pins that are attached to the housing and which run parallel to the axis of rotation of the rotor and lie radially outwardly of the piston skirt. All of the stator discs except the primary stator disc project through opposed axial slots in the piston skirt to permit the engagement with the torque pins. The use of the slotted piston skirt through which the stator discs project permits a compact assembly. When hydraulic pressure is applied to the piston, the piston skirt engages the primary stator disc and moves it in opposition to the spring means, thereby releasing the brake.

Detailed Description

Figure 1:
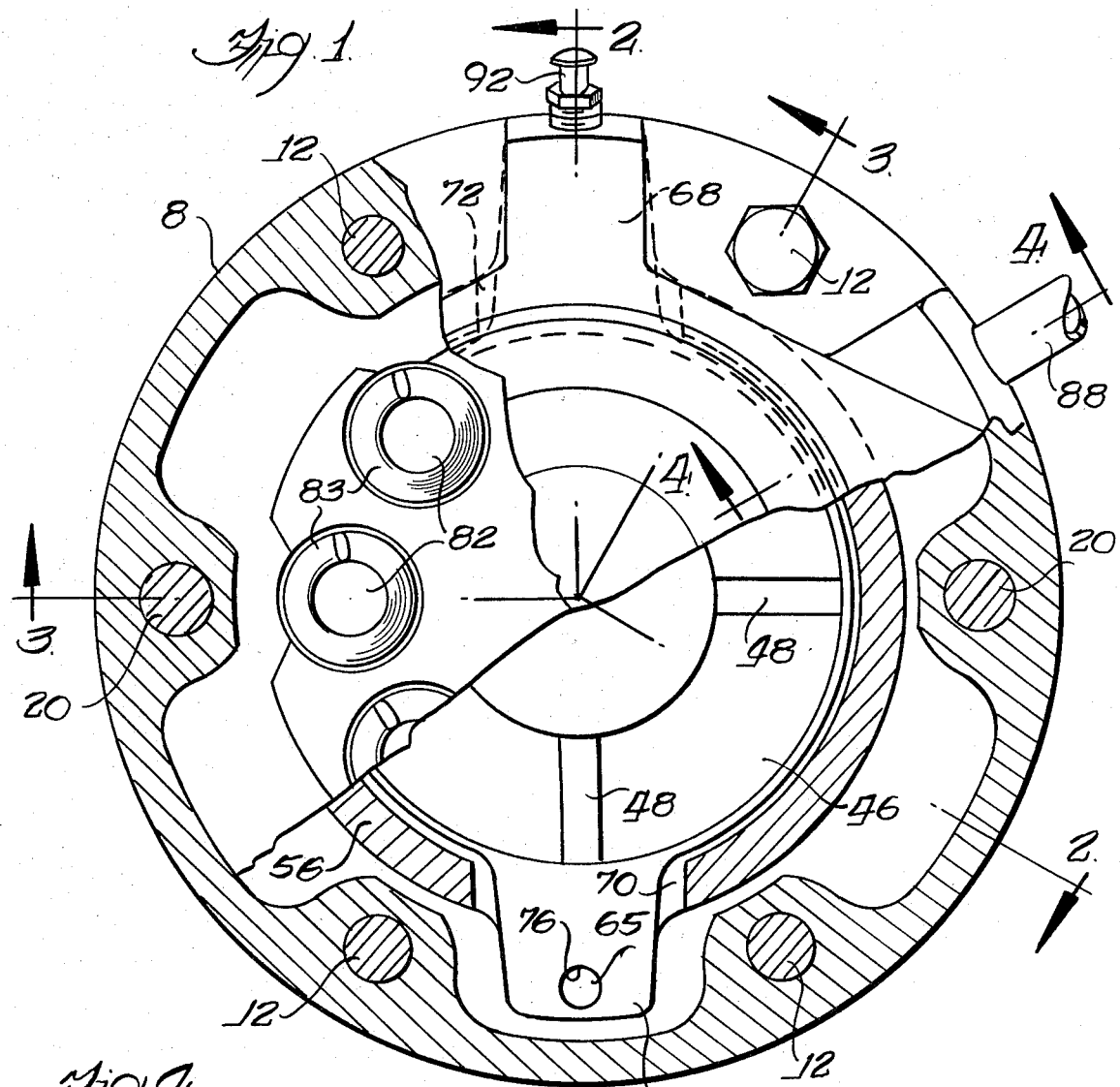
FIG. 1 is a front elevational view, partially broken away and in section, of the structure of FIG. 2 and showing a brake in accordance with the invention.

Referring now in more detail to the drawing, which illustrates a preferred embodiment of the present invention, 2 designates a hydraulic disc brake that is interposed between a driving unit, such as a hydraulic motor 4 and a driven unit, such as a gear box 6. The brake 2 comprises a housing 8 that includes a front or power plate 10 which is secured to the remainder of the housing 8 by circumferentially spaced bolts 12. At the front end of the power plate 10 is an annular axial flange 14 that defines an opening for receiving a companion-shaped cylindrical projection 15 on the housing of the hydraulic motor 4. The housing 8 also has a cylindrical rear extension 16 that fits into a companion-shaped cylindrical cavity 17 in the gear box 6.

The brake 2, motor 4, and gear box 6 may be secured together in any suitable manner. In the form of the invention herein shown, the motor housing has opposed flanges 18 that receive bolts 20. The bolts 20 pass through aligned openings 22 in the flange 18, the power plate 10, and the adjacent part of the housing 8. The bolts 20 are threaded into threaded holes 24 in the gear box 6.

Centrally of the housing the brake 2 includes a rotor, generally designated at 26. At one end, the rotor 26 has a hollow input shaft portion 28 that coaxially and removably couples with the output shaft 30 of the motor 4. The output shaft 30 is externally splined and the input shaft portion 28 is internally splined for receiving the splines of the output shaft 30 so that a driving engagement between the shaft 30 and the portion 28 is thereby established. At the opposite end of the rotor 26 has an output shaft portion 32 that is externally splined for removable coupling to a companion-shaped internally splined socket 34 in the input shaft 36 of the gear unit. This establishes a driving connection between the rotor 26 and the shaft 36. Furthermore, when the brake 2, the motor 4, and gear box 6 are assembled, the motor shaft 30, the rotor 26 and the input shaft 36 will be in coaxial relationship.

Journalling the rotor 26 in the housing 8 is a bearing 38 that is retained in position by a snap-ring 40. The bearing 38 is preferably a sealed bearing to prevent leakage therepast of any oil which may leak from the adjacent gear box 6.

The central part of the rotor 26 is formed with external axial splines for supporting rotor discs 44, 44, 44. The rotor discs have central openings that are splined so that the rotor discs float on the splines 42 of the rotor 26. Consequently, the rotor discs 44 rotate with the rotor 26 but are capable of axial movement thereon. Furthermore, the splined connections of the rotor discs 44 with the rotor tends to make these rotor discs 44 self-centering, thereby minimizing dynamic balance problems and permitting a high speed of rotation of the rotor 26. The opposed axial faces of the rotors are provided with friction material 46. The friction material 46 may be in the form of segments, thereby forming radial grooves 48 in the opposed faces of the rotor discs 44.

Formed in the power plate 10 is an annular cylindrical chamber 50 that is coaxial with the rotor 26 and which opens in a direction away from the flange 14. Positioned within the chamber 50 for axial sliding movement is an annular piston 52. The piston 52 carries inner and outer O-ring seal members 54, 54. The piston further includes an annular piston skirt 56 that surrounds the rotor discs 44, 44, 44, being in radially outwardly spaced relation thereto. The annular skirt 56 thus lies in a radially outer portion of a generally cylindrical housing cavity 58.

Interleaved with the rotor discs 44, 44, 44, are metallic stator discs, 60, 60, 60, 62, the disc 62 being somewhat larger than the other stator discs and constituting a primary stator disc that abuts the end of the piston skirt 56. The stator disc 62 is the end-most disc of the disc assembly that is made up of the rotor discs and the stator discs. Each of the stator discs 60, 60, 60, 62 have central clearance holes 64 through which the rotor 26 extends.

Figure 2:
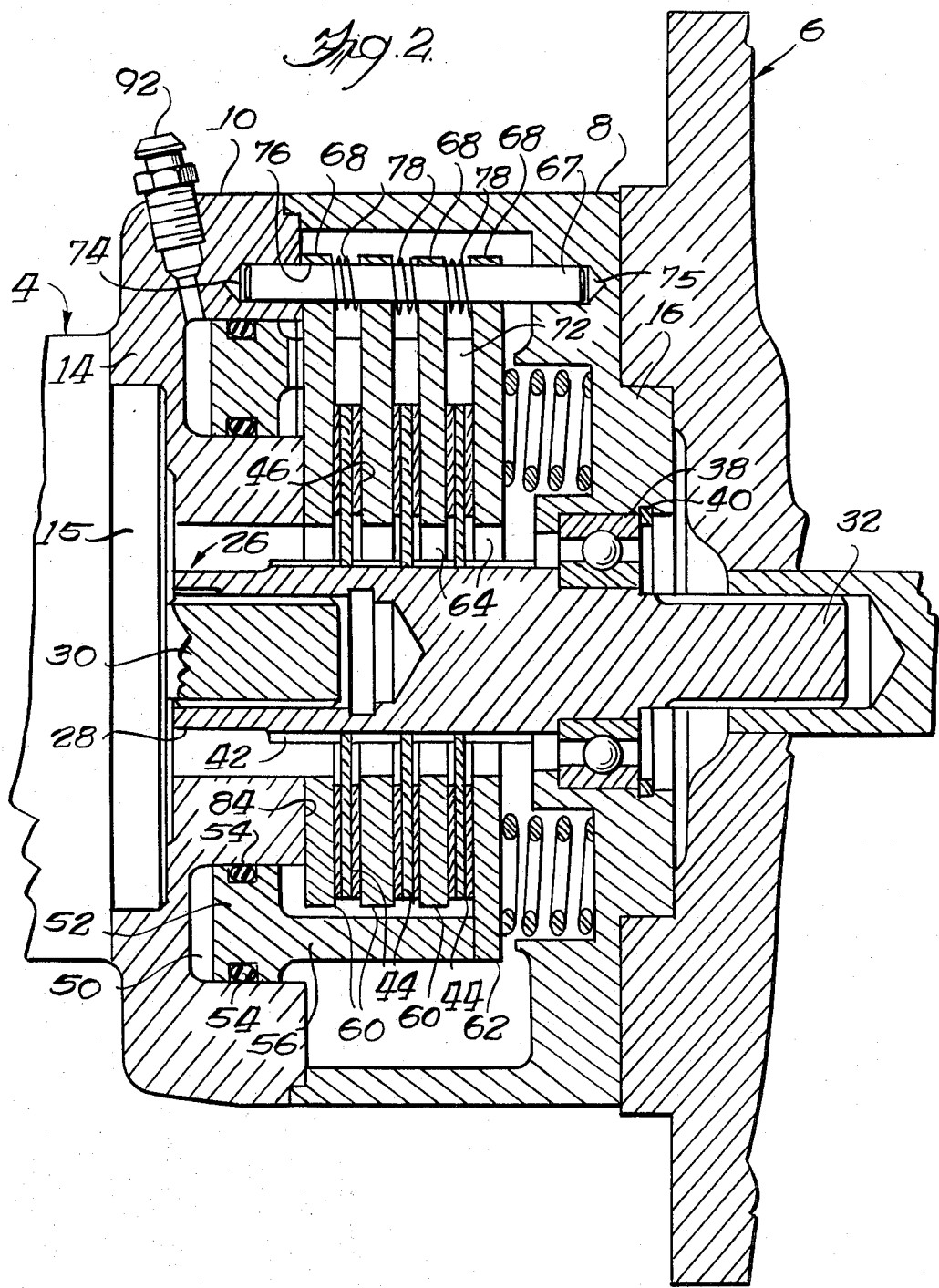
FIG. 2 is a sectional view taken along line 2—2 Of FIG. 1.

The stator discs are maintained non-rotatable relative to the housing 8 by torque pins 65, 67 that run parallel to the axis of rotation of the rotor 26 but which lie radially outwardly of the piston 52. Thes torque pins 65, 67 are respectively fitted into respective opposed holes 74, 75 in the power plate 10 and in the adjacent part of the housing 8. Each of the stator discs 60, 60, 60, have diametrally opposed ears 66, 68 that project freely through opposed, axially extending slots 70, 72 in the piston skirt 56, as best seen in FIGS. 1 and 2. The slots 70, 72 extend to the end of the skirt 56 that abuts the primary stator disc 62. Thus the primary stator disc 62 has a like set of ears 66, 68 but these do not project through the slots 70, 72, although they are in axial alignment therewith. The ends of the ears 66, 68 have holes 76 to permit sliding of the stator discs 60, 60, 60, 62 on the torque pins 65, 67.

Figure 3:
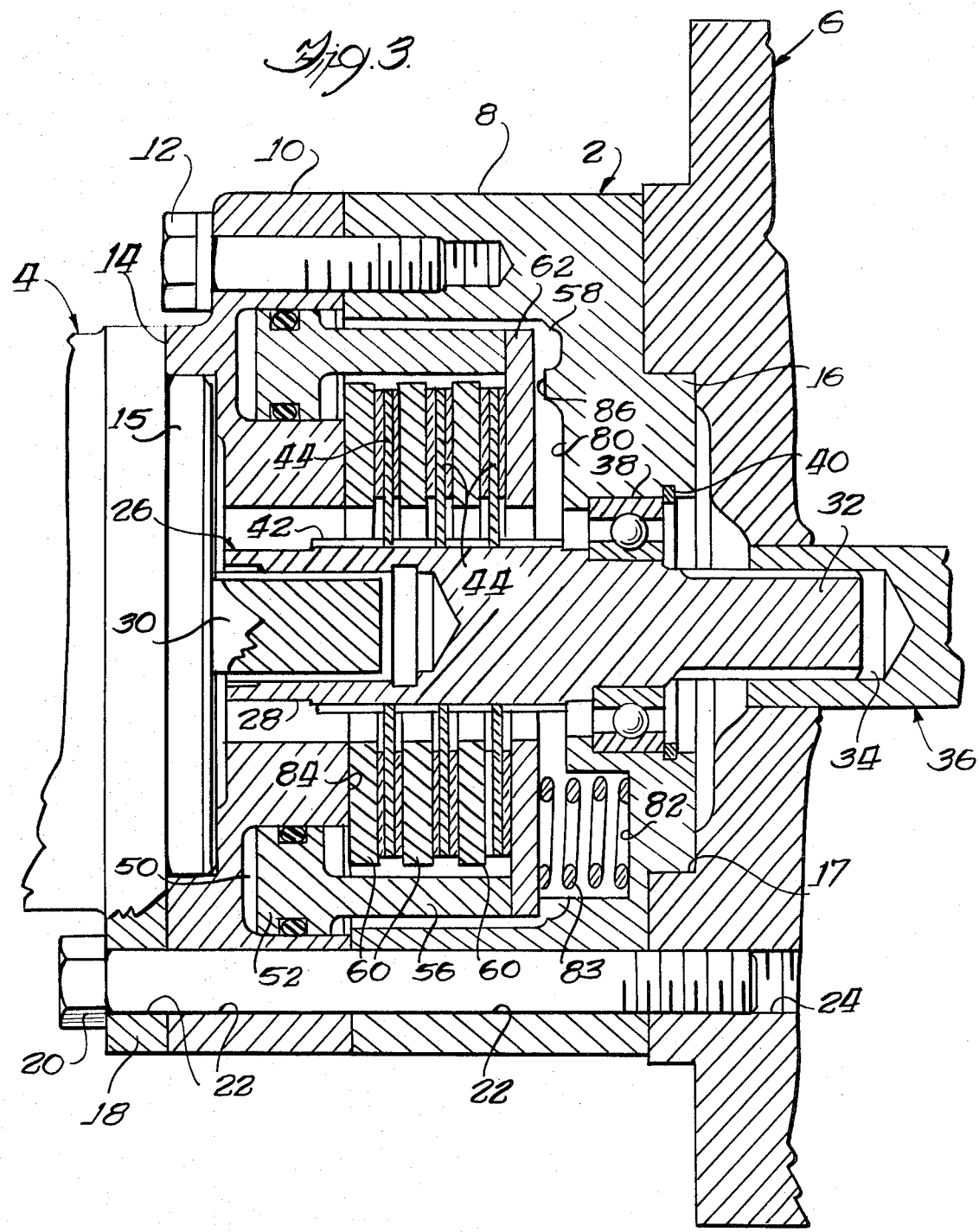
FIG. 3 is a sectional view taken along line 3—3 of FIG. 1.

It will be seen, therefore, that in the regions of the stator discs 60, 60, 60 that are circumferentially offset from the ears 66, 68, there is radial clearance between the stator discs 60, 60, 60 and the skirt 56, as shown in FIG. 3. However, in the region of the primary stator disc 62 that is circumferentially offset from the ears 66, 68 thereon, the stator disc 62 is in peripheral engagement with the skirt 56. It will also be seen that the foregoing arrangement of providing ears on the stator discs that extend through axial clearance slots on the piston skirt for sliding engagement on the torque pins permits containment of the brake components within a relatively small diameter. Furthermore, coil springs 78, 78, 78 are mounted on the torque pins on opposite sides of the inner two stator discs 60, 60 so as to locate the stator discs in a manner lining wear on the rotor discs at such times as the brake is disengaged. Additionally, the springs 78 add to the self-damping characteristic of the unit. Also, the springs 78 together with springs 83 (hereafter described) reduce vibration and noise during rotation of the rotating elements of the unit.

Formed in the end wall 80 of the cavity 58 is a plurality of bores 82 for receiving coil compression springs 83 that bear against the primary stator discs 62. Other types of springs may, of course, be used. Thus, when the brake is engaged, the pressure of the springs 83 apply axial force to the primary stator disc 62. The disc assembly is, therefore, biased against an axially presented abutment surface 84 on the inner surface of the power plate 10. The force of the springs 83 is sufficient to press the rotor and stator discs into frictional engagement to retain the rotor against rotation. This is the normal or engaged condition of the brake.

The brake is released by introducing hydraulic fluid into the chamber 50. The fluid pressure forces the piston 52 in the direction of the primary stator disc 62 and in opposition to the force of the springs 83. This releases the axial pressure on the respective rotor and stator discs whereby the rotor 26 can now be driven. The end wall 80 is formed with a shoulder 86 that limits the axial movement of a stator disc 62 under applied force from the piston skirt 56.

Figures 4, 5:
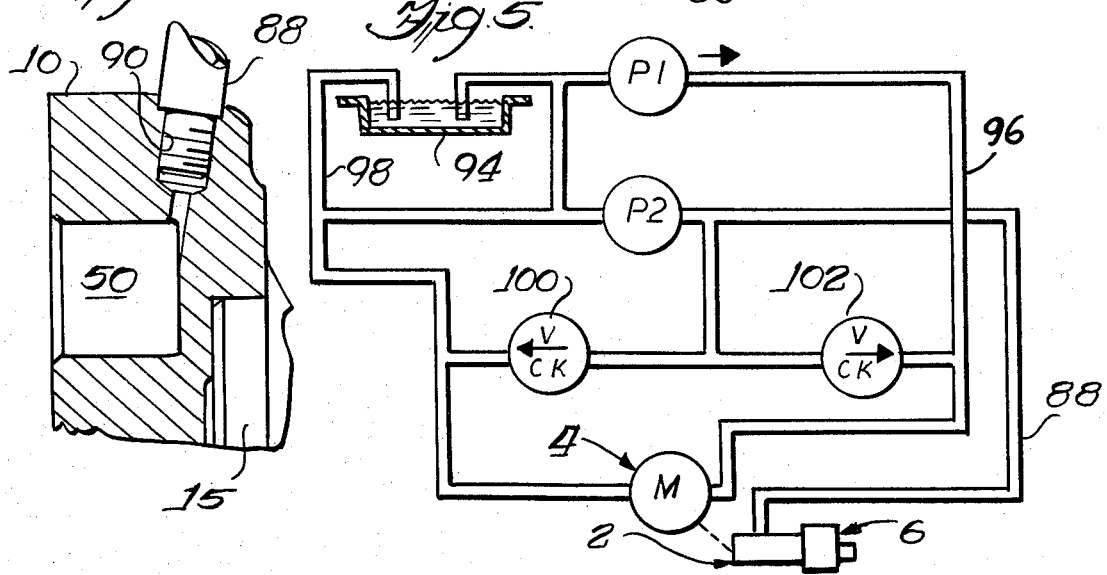
FIG. 4 is a fragmentary sectional view taken along line 4—4 of FIG. 1.
FIG. 5 is a hydraulic circuit diagram illustrating one type of system in connection with which the brake of this invention may be used.

As best seen in FIGS. 1, 4 and 5, hydraulic fluid is introduced into the chamber 50 through a conduit 88 that is threaded into a hole 90 in the power plate 10. Circumferentially remote from the hole 90 the power plate may have another hole for receiving a screw-type bleeder valve 92.

FIG. 5 shows an abbreviated or simplified type of hydraulic system with which the present brake may be used, but it will be understood that the system herein shown and described is by way of example and not of limitation. In the system of FIG. 5 a fixed pressure pump P2 and a variable pressure pump P1 draw from a hydraulic fluid reservoir 94. The pump P2 maintains a charge pressure for the system and supplies the necessary pressure through conduit 88 to release the brake. Pump P1 increases the system pressure from the charge pressure to the operating pressure necessary to drive the motor 4. The operating pressure is supplied through conduit 96 and returns through conduit 98, which is the low pressure side and is at charge pressure as a result of the check valve 100. Check valve 102 prevents high pressure from the conduit 96 from entering the charge pressure line. If the charge pressure is lost or is intentionally released, the brake will automatically engage.

The invention is claimed as follows:

1. A brake comprising a rotor having means for coupling to a shaft, a plurality of rotor discs, cooperating means on said discs and said rotor for mounting the rotor discs on the rotor for rotation therewith but permitting axially sliding movement of the rotor discs relative to said rotor, a stator including a housing that receives said rotor and said rotor discs, a plurality of stator discs in said housing and being interleaved with said rotor discs, said rotor discs and said stator discs comprising a disc assembly that has a primary stator disc, an abutment in said housing, spring means interposed between said primary stator disc and a part of said housing for biasing said disc assembly against said abutment when the brake is engaged, a piston in said housing and having an annular skirt engaging said primary stator disc and being in surrounding relation to the rotor discs, said piston skirt having at least one axial slot, torque pin means radially outwardly of said skirt and attached to said housing, a plurality of said stator discs projecting through said slot for engagement with said torque pin means such that the stator discs are axially slidable on said torque pin means but are retained non-rotatably in said housing, said piston being axially movable upon application of fluid pressure thereto to shift said primary stator disc away from said abutment and in opposition to said means, thereby to release said brake.

2. A brake according to claim 1 in which said primary stator disc is an end-most of said stator discs.

3. A brake according to claim 1 in which said torque pin means has springs thereon that are interposed between adjacent stator discs.

4. In a hydraulic brake having a rotor, rotor discs rotatably mounted on the rotor, a stator including stator discs interleaved with the rotor discs and torque pins attached to the peripheries of the stator discs to prevent rotation of said stator discs but permitting axial sliding movement thereon, spring means normally biasing the rotor and stator discs axially into frictional engagement to provide a brake-engaged condition, and a piston operable by hydraulic fluid in opposition to said spring means and having an annular skirt engaging one of said stator discs to shift said one stator disc axially and release said frictional engagement, said skirt having axially extending slots through which a plurality of said stator discs project to permit engagement thereof with said torque pins.

5. In a hydraulic brake according to claim 4, said torque pins having a coil spring interposed between two adjacent stator discs.

6. In a hydraulic brake according to claim 4, said rotor and rotor discs having a splined connection.

7. A brake comprising a rotor having an output shaft portion for removable coupling to a unit to be driven and an input shaft portion for removable coupling to a power input unit, axially shiftable rotor discs on said rotor in splined connection therewith, a stator including a housing that receives said rotor, said housing comprising a power plate at one end thereof and presenting an annular abutment surface, a plurality of axially shiftable stator discs in said housing and being interleaved with said rotor discs, said rotor discs and stator discs comprising a disc assembly, spring means normally biasing said disc assembly into brake engaged position, an annular chamber in said power plate surrounding said abutment surface, an annular piston in said chamber and having an annular skirt surrounding said rotor discs and engaging one of the stator discs of said disc assembly at an end opposite from said abutment surface, said disc assembly being axially intermediate said piston and said spring means and including at least a second end stator disc disposed for engagement with said abutment surface, said skirt also surrounding and extending axially along said last mentioned stator disc, said piston being operable in opposition to said spring means to release said brake, a bearing in said housing and journalling said rotor at said output shaft portion thereof, said bearing being axially spaced from said disc assembly, and means for mounting said housing on the unit to be driven and on the power input unit, torque absorbing means in said housing, said last mentioned stator disc including a radially projecting portion for engaging the torque absorbing means, and said skirt having an opening therein providing clearance for said radially projecting portion.

8. A brake comprising housing means for receiving a rotor, axially shiftable rotor disc means within said housing and connectable with said rotor for rotation therewith and for relative axial movement with respect thereto, a plurality of axially shiftable stator discs in said housing and interlleaved with said rotor disc means, said rotor disc means and said stator discs comprising a disc assembly, spring means engaging a first stator disc and normally biasing said disc assembly into brake engaged position, piston means in said housing and including means extending axially along peripheral edges of said rotor disc means and at least a second of said stator discs and engaging said first stator disc of the disc assembly for releasing the brake upon actuation of the piston means, torque absorbing means in said housing, said stator discs including radially projecting portions for engaging said torque absorbing means, and said axially extending means of said piston means providing clearance for said radially projecting stator disc portions.

9. A brake according to claim 8, wherein said piston means includes annularly arranged portions and said axially extending means includes annularly arranged portions engaging said first stator disc.

10. A brake according to claim 9, wherein said spring means includes a plurality of annularly arranged coil springs engaging said first stator disc oppositely from said piston means.

* * * * *

UNITED STATES PATENT OFFICE
CERTIFICATE OF CORRECTION

Patent No. 3,863,038          Dated JANUARY 28, 1975

Inventor(s) CHARLES A. KREITER and GEORGE H. MORGAN

It is certified that error appears in the above-identified patent and that said Letters Patent are hereby corrected as shown below:

Col. 2, line 60, before "portion" insert --shaft--
Col. 3, line 46, "thes " should be --these--
Col. 4, line 8, after "manner" insert -- to minimize--
Col. 5, line 18, after "said" insert --spring--
Col. 5, line 21, after "most" insert --one--
Col. 6, line 30, "interlleaved" should be --interleaved--

Signed and sealed this 15th day of April 1975.

(SEAL)
Attest:

RUTH C. MASON
Attesting Officer

C. MARSHALL DANN
Commissioner of Patents
and Trademarks